(12) United States Patent
Bytow

(10) Patent No.: US 6,168,006 B1
(45) Date of Patent: Jan. 2, 2001

(54) SORTING APPARATUS FOR PARTS FROM WORKPIECE CUTTING MACHINE

(75) Inventor: Peter Bytow, Simmozheim (DE)

(73) Assignee: Trumpf GmbH & Co. (DE)

( * ) Notice: Under 35 U.S.C. 154(b), the term of this patent shall be extended for 0 days.

(21) Appl. No.: 09/273,242

(22) Filed: Mar. 19, 1999

(30) Foreign Application Priority Data

Mar. 21, 1998 (DE) .......................................... 298 05 197 U

(51) Int. Cl.[7] .................................................. B65G 47/46
(52) U.S. Cl. ..................................... 198/370.04; 198/360
(58) Field of Search ................................ 198/840, 890.1, 198/369.3, 360, 361, 370.01, 370.04, 370.07, 371.2, 370.08

(56) References Cited

U.S. PATENT DOCUMENTS

| 3,010,160 | * | 11/1961 | Lytton et al. | 198/371.2 X |
| 4,765,488 | * | 8/1988 | Moriarity | 198/371.2 X |
| 4,804,078 | * | 2/1989 | Scata | 198/360 X |
| 5,641,052 | * | 6/1997 | Lazzarotti et al. | 198/360 X |
| 5,701,992 | * | 12/1997 | Enomoto | 198/370.1 X |
| 5,839,566 | * | 11/1998 | Bonnet | 198/370.04 |

FOREIGN PATENT DOCUMENTS

487641 * 12/1929 (DE) ..................................... 198/360

* cited by examiner

Primary Examiner—James R. Bidwell
(74) Attorney, Agent, or Firm—Pepe & Hazard LLP

(57) ABSTRACT

A machine tool/parts sorter assembly includes a machine tool having a frame and a workstation at which multiple parts are cut from a workpiece as it is moved in a horizontal plane relative to the workstation. A sorter is coupled with the machine tool frame for separately guiding different parts to different discharge areas adjacent the machine tool. The sorter includes a guide member adjacent the workstation for receiving the parts from the workstation, a pair of spaced, downwardly inclined guide chutes for discharging parts to separate discharge areas, and an actuator for selectively moving the guide member to discharge parts thereon into the guide chutes.

15 Claims, 8 Drawing Sheets

SORTING APPARATUS FOR PARTS FROM WORKPIECE CUTTING MACHINE

BACKGROUND OF THE INVENTION

The invention concerns a device for sorting work piece parts cut out on a machine for cutting out work pieces in the case of processing at a processing station with at least one guiding device located at the processing station under a plane of the work piece processed with at least one guide element, by means of which the work piece parts can be guided to at least two different removal devices and in this way delivered to two different storage areas.

Such sorting devices are known to be used on sheet metal cutting machines, by means of which parts with predetermined contours are cut out of sheet metal plates. The cutting station of the machine in this case also is stationary as a guide device for the work piece parts, which as a guide element for the work piece parts has two inclined planes leading in different directions. The sheet metal plate to be processed is moved by means of a numerically controlled coordinate guide opposite the cutting station of the machine. With separation of the last connecting points between the sheet metal part and the sheet metal place, the cut-out part drops down from the cutting station under the effect of the force of gravity and thus onto one of the two inclined planes of the guiding device. Onto which of the two inclined planes the sheet metal part falls, and consequently the direction of removing the sheet metal part, is determined by the position of the sheet metal part vis a vis the guiding device at that moment when its last connection with the rest of the sheet metal plate is severed, and thus by the position of the last connection of the sheet metal part. Correspondingly, the coordinate guiding of the previously known machine is to be controlled in such a way that at the time of making the last separating cut the cut-out sheet metal part is located over the one of the two inclined planes of the guiding device by means of which the removal in can be carried out in the desired removal device. The position of the last separating cut on the work piece is predetermined correspondingly by programming the machine control and varies depending on the desired direction of removal.

The sorting of the work piece parts arriving at the cutting station of the previously known sheet metal cutting machine needs a considerable control, or, as the case may be, programming, expense.

The task of the present invention consists in simplifying the sorting of the work piece parts.

SUMMARY OF THE INVENTION

In accordance with the invention this task is solved by means of the fact that on a device of the type mentioned initially the guide element is controllable and different directions of removal of the work piece parts are associated with different control states of the guide element. The device in accordance with the invention permits a sorting of the work piece parts cut out at the processing station with the prerequisite that at the time of making the last separating cut these assume a position, staring from which they can reach the guiding device. The device for removing work piece parts to the different storage areas is determined only on the guiding device. The control of the guide element necessary for this purpose requires only a slight expense. Consequently, the cutting can be guided uniformly along the outer contour of the work piece parts and in this case without the sorting process following the work piece processing having to be taken into account by means of the guide element or elements.

A preferred embodiment of the device in accordance with the invention is distinguished by means of a simple kinematics of the guide element for determining the work piece part removal device, in the case of which the guide element can be swivelled around at least one swivel axis and is controllable in at least two swivel positions, with which different work piece part removal devices are associated.

A guide vane capable of swivelling around at least one swivel axis with a guide surface for the work piece parts—as provided in a further development of the invention—is recommended as a structurally simple and functionally secure guide element.

In swivel positions, with which different directions of removal of the work piece parts are associated, the guide vane can be controlled in the case of a further version of the device in accordance with the invention by swivelling it around two swivel axes running parallel to each other, separated from one another parallel to the guide surface.

Structurally the swivelling capacity of the guide vane around two swivel axes in the sense of the invention is made possible by the fact that the guide vane is connected swivellable around a first swivel axis with a bearing plate supporting the guide vane on one side in the direction of swivelling, which bearing plate is mounted capable of swivelling around a second swivel axis and that in each case a controllable elevating mechanism engages the guide vane at a distance from the first swivel axis and the bearing plate at a distance from the second swivel axis, by means of which elevating mechanism the guide vane can be swivelled around the first swivel axis, or, as the case may be, the unit of the guide vane and the bearing plate can be swiveled around the second swivel axis. In the case of the swivel motion around the second swivel axis, the baring plate puts the guide vane supported on it in the direction of swiveling.

In the interest of a space-saving construction of the guiding device in the case of a preferred embodiment of the device in accordance with the invention, it is provided that the guide vane is connected capable of swiveling around a first swivel axis with a bearing plate supporting the guide vane on one side in the direction of swivelling and can be locked against swivelling with the bearing plate, and that a controllable elevating mechanism engages the guide vane at a distance from the first as well as the second swivel axis, by means of which elevating mechanism the guide vane can be swivelled around the first axis, or, as the case may be, the unit of the guide vane as well as the bearing plate locked with it can be swivelled around the second swivel axis. The capability of locking the guide vane and bearing plate opens the possibility of optionally swivelling the guide vane around one or the other swivel axis with a single elevating mechanism.

In a preferred further development of the last-named embodiment of the invention, the guide vane and the bearing plate can be locked with one another by means of a locking pin, the movement of which can be controlled on one part, and a locking pin support on the other part.

In accordance with the invention in this case the locking pin is formed by a piston rod of a piston-cylinder unit, the operation of which can be controlled.

A controllable piston-cylinder unit hinged capable of turning on the guide vane or on the bearing plate around a swivel axis parallel to the swivel axis concerned is provided as a continuously functionally reliable and easy to control elevating mechanism for the guide vane, or, as the case may be, the bearing plate.

In the case of a further design of the device in accordance with the invention, the guide vane is capable of swivelling around a swivel axis located on its edge. In addition, or alternatively, the guide vane in a further embodiment of the invention is made as a rocker capable of swiveling around a swivel axis located at a distance from vane edges lying at a distance opposite each other.

As an alternative to a swivelable guide element of the type described above, in the case of one embodiment of the device in accordance with the invention an endless conveyor belt for the work piece parts, capable of being controlled in its direction of motion, is provided as a guiding element. Such a conveyor belt makes it possible to convey the work piece parts to be sorted in different directions in the case of low design heights transverse to the plane of the conveyor belt.

A secure intermediate storage of the work piece parts cut out at the processing station before they are removed to different storage sites is provided in a further development of the invention by connecting a chute to the guiding device in order to convey the work piece parts from the processing station and by providing the guide vane or the conveyor belt in the case of an essentially horizontal orientation with an effective stop for the work piece parts in the direction of conveyance. Via the chute the work piece parts reach the guide vane or the conveyor belt, where the stop provided there holds them back, before they then are guided in the desired direction and removed by corresponding control of the guide vane or the conveyor belt.

Instead of a guide vane or a controllable conveyor belt, in the case of a further design of the device in accordance with the invention a swivel lever of a deflector-like guide device is provided as a guide element, which is capable of swiveling on a bearing surface for the work piece parts around a swivel axis running transverse to the bearing surface.

DESCRIPTION OF THE DRAWINGS

The invention is explained in greater detail below by means of schematic representations of specific embodiments. Here.

DETAILED DESCRIPTION OF THE PREFERRED EMBODIMENTS

Figure 1:
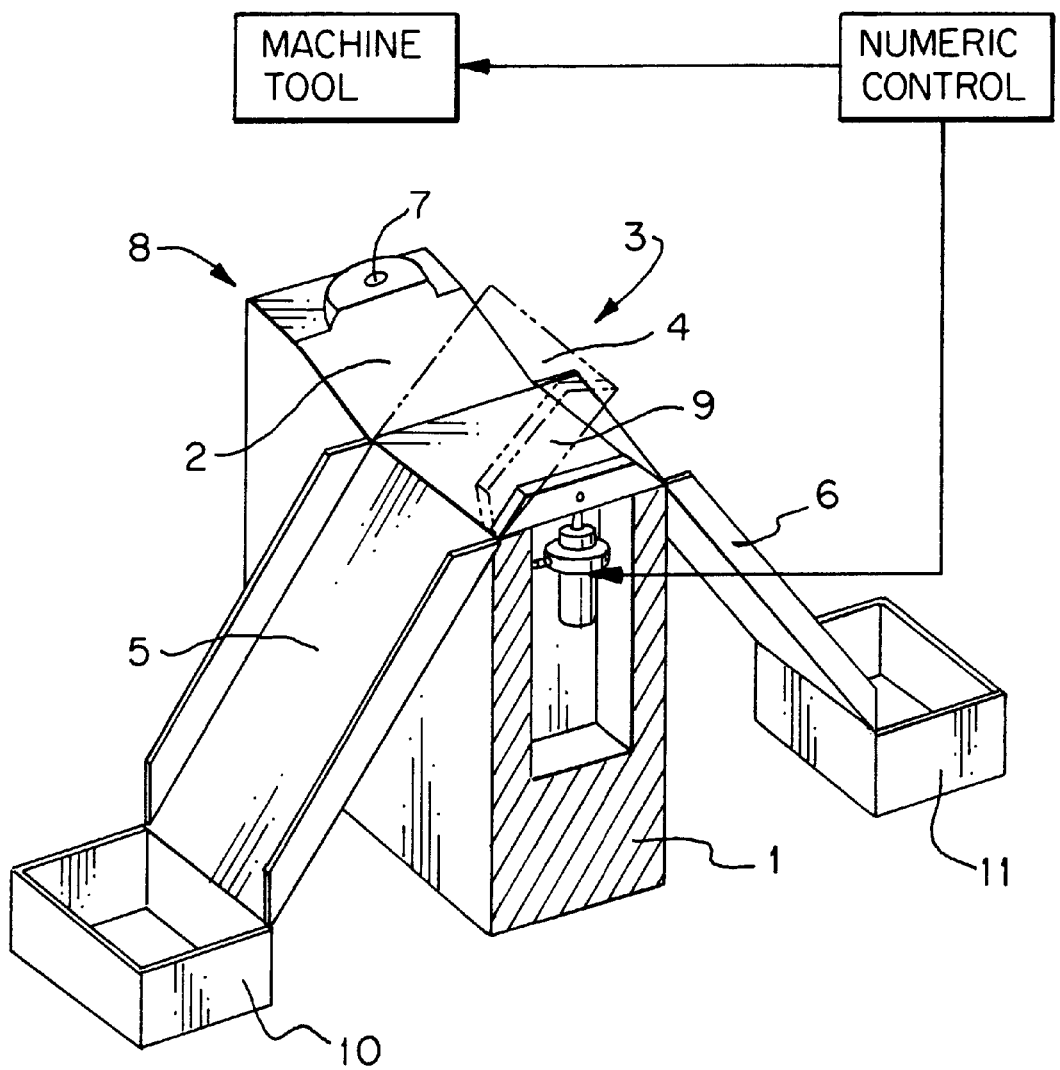
FIG. 1 illustrates a first embodiment of a device for sorting punched parts produced on the sheet metal punching machine (only partially shown) with the guide member shown in solid line in a horizontal position and in phantom line in a first tilted position.

In accordance with FIG. 1 a sorting device for sheet metal parts is located on a base frame 1 of a sheet metal punching machine. The sorting device essentially includes a feeding chute 2, a guide device 3 with a guide element in the form of a guiding vane 4, as well as removing chutes 5, 6.

Figure 2:
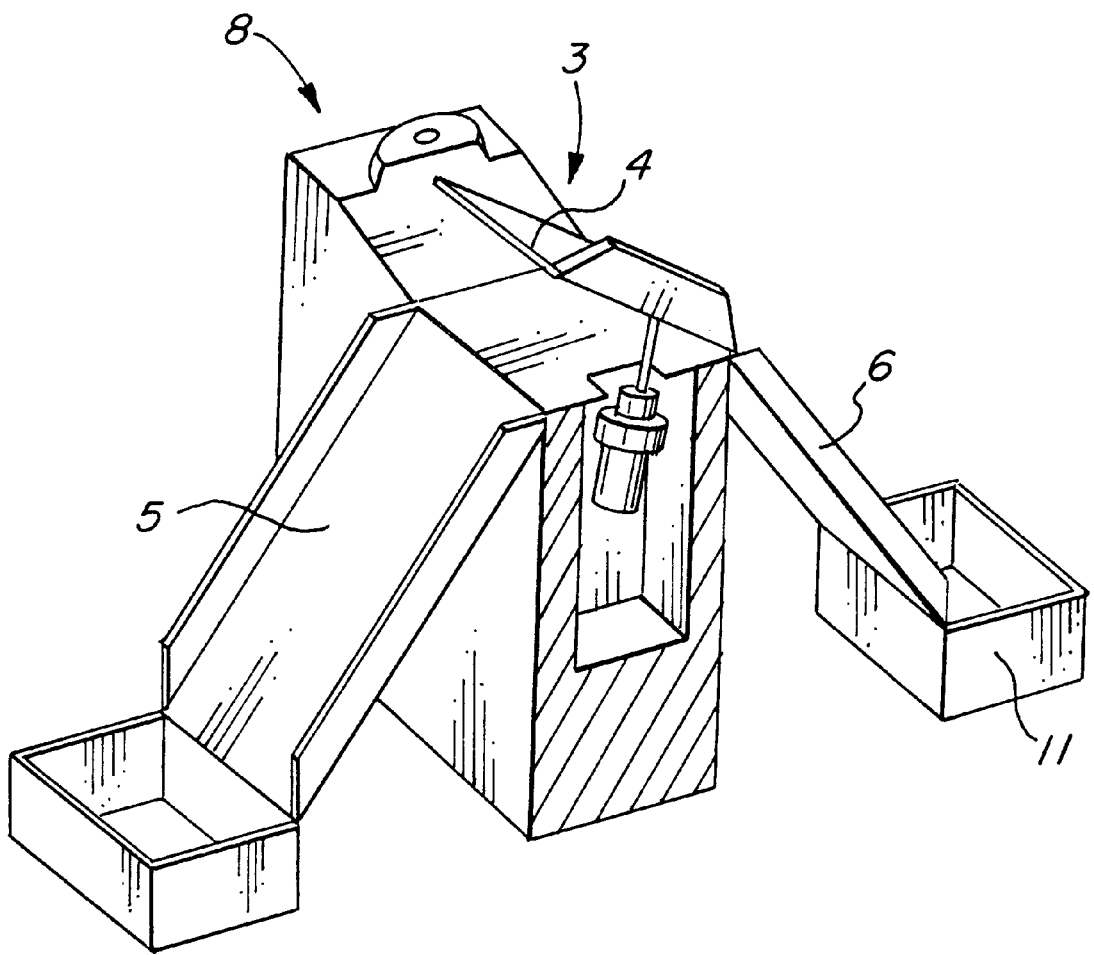
FIG. 2 is a similar view of the device and machine with guide member shown in a second titled position.

The feeding chute 2 extends inclined downward from a punch die 7 of a processing station designed as a punch station 8. The punch die 7 supports the sheet metal to be processed at the time of its processing and defines the sheet metal plane together with a work piece table. The guide device 3 is connected on the side of the feeding chute 2 lying at a distance from the punch die 7 with the guide vane 4 on the feeding chute 2. In the initial position shown in FIG. 1 with extended lines, the guide vane 4 is oriented horizontally. Opposite the feeding chute 2 it has a stop 9 for the sheet metal parts fed to it. Extending from the guide vane 4 the removing chutes 5, 6 extend in directions opposite one another and open into collecting and transporting boxes 10, 11, At the punching station 8, numerically controlled sheet metal parts with different contours are punched out a sheet metal plate. Uniformly contoured sheet metal parts are to be delivered to one and the same collecting and transporting boxes for discharging from the sheet metal stamping machine. For this purpose the sheet metal to be processed by punching is positioned by means of a numerically controlled coordinate guide opposite the punch station 8 in such a way that the sheet metal part concerned is located over the feeding chute at the time of separating its last connection with the rest of the sheet metal. After making the last separating cut, the sheet metal part concerned consequently falls onto the feeding chute 2, via which it reaches the horizontally oriented guide 4 of the guide device 3 under the action of the force of gravity, and is temporarily stored there. In this case the stop 9 prevents the sheet metal part from sliding out in the direction of removal over the guide vane 4. For example, depending of the dimensions of the sheet metal parts produced, the guide vane 4 is operated for each sheet metal part temporarily stored on the guide vane 4 or for several sheet metal parts. In this case the guide vane 4 can be swivelled into the position shown in FIG. 1 with interrupted lines or in the position shown in FIG. 2. In the case of the position raised on one side in accordance with FIG. 1, the sheet metal part or parts temporarily stored on the guide vane 4 are conveyed via the removing chute 5 into the collecting and transporting box 10. Correspondingly sheet metal parts temporarily stored on the guide vane 4 are fed to the collecting and transporting box 11 via the removing chute 6 in the case of the position of the guide vane 4 in accordance with FIG. 2.

Figure 3:
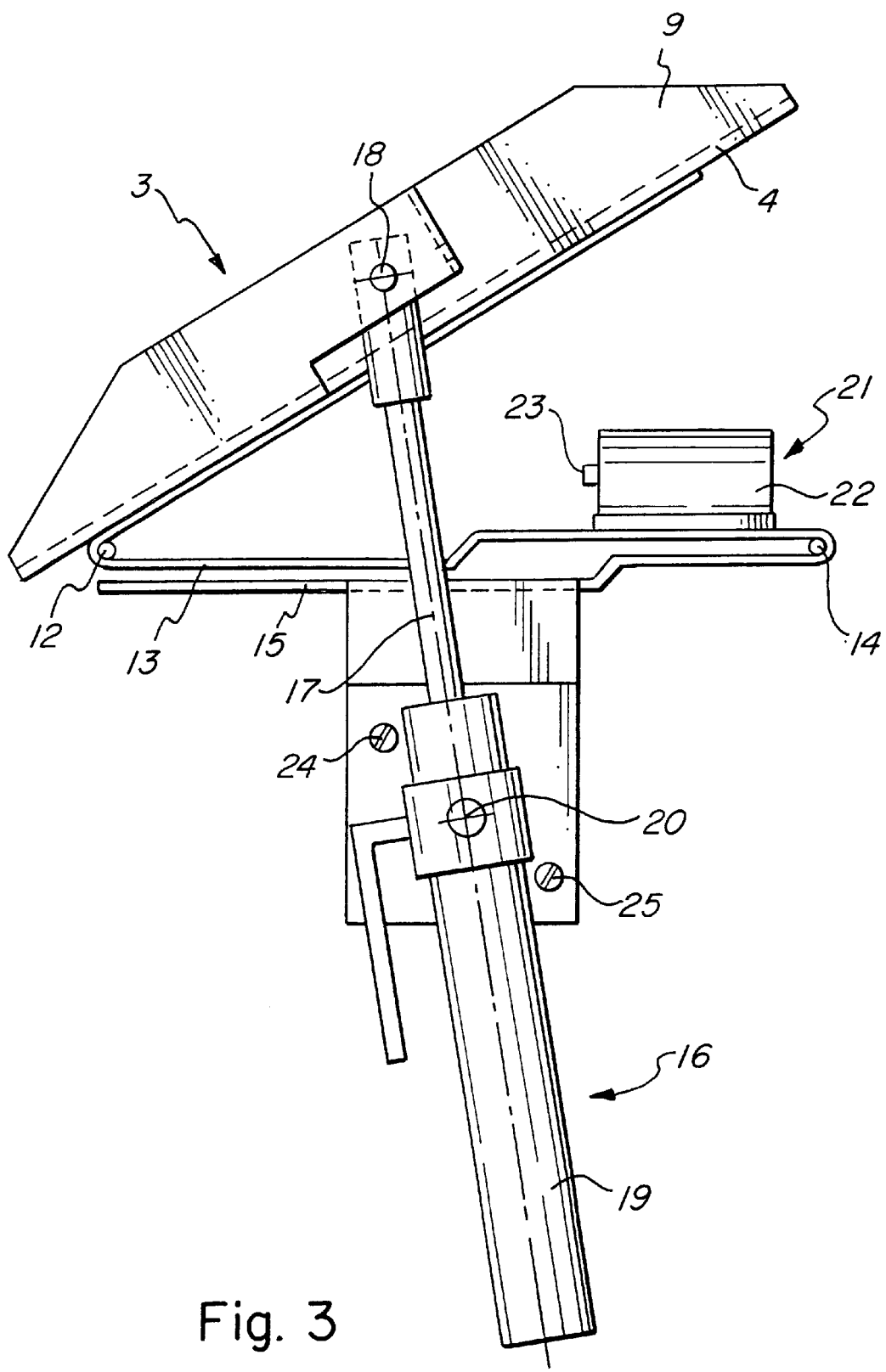
FIG. 3 is an enlarged illustration of the sorting device of FIG. 1 also showing a second piston/cylinder assembly.
Figure 4:
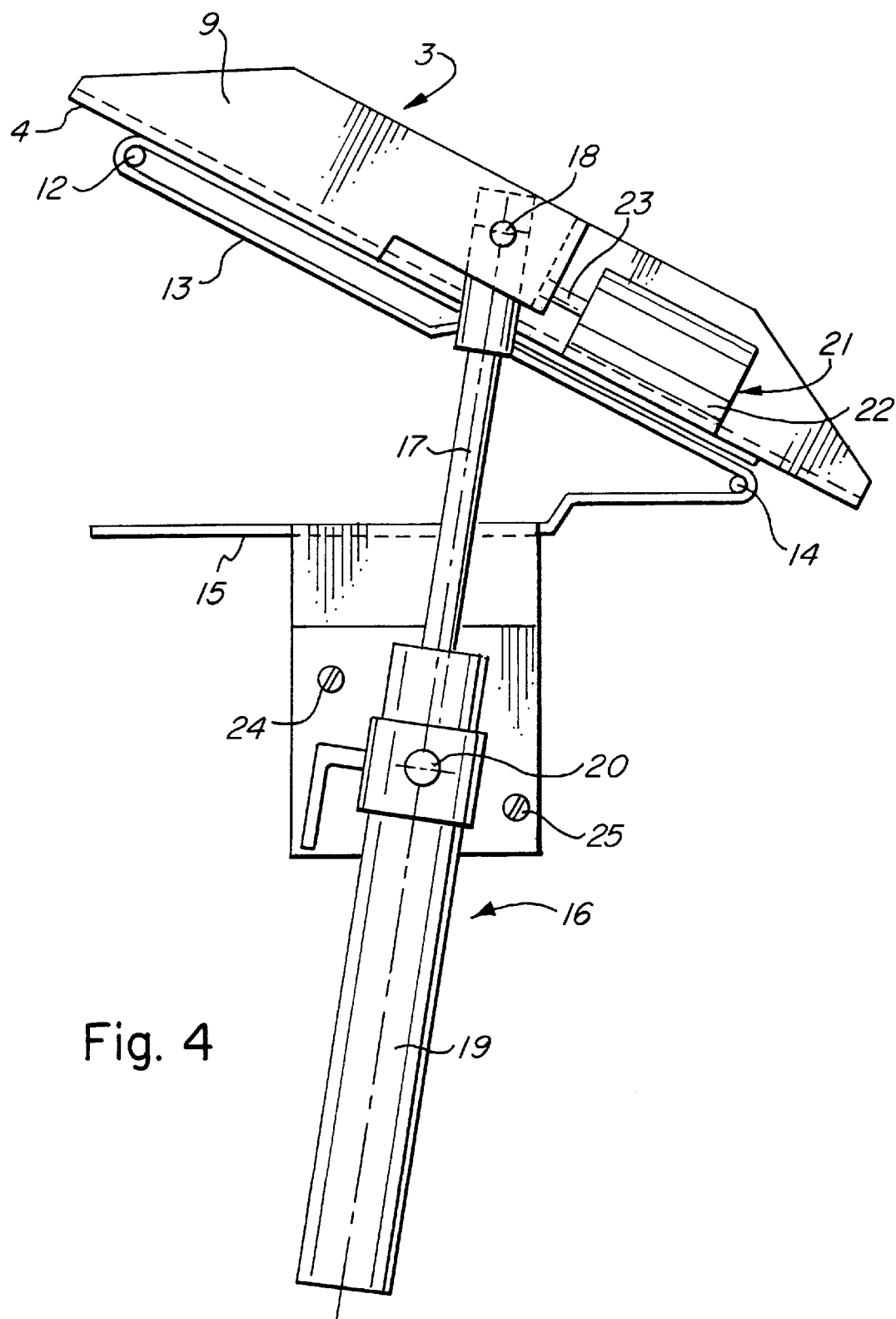
FIG. 4 is a similar illustration with the sorting device in the alternate position seen in FIG. 2.

The design features for realizing the described kinematics of the guide vane 4 are shown in FIGS. 3 and 4. Therefore the guide vane 4 is connected with a bearing plate 13 supporting the guide vane 4 on one side in the direction of swivelling, capable of swivelling around a first swivel axis 12. The bearing plate 13 again around a second swivel axis 14, is connected with a base plate 15, which for its part is mounted on the base frame 1 of the sheet metal punching machine. At a distance from the first swivel axis 12 as well as from the second swivel axis 14 parallel to the plane of the bearing surface for the sheet metal parts on the guide vane 4 as well as in the transverse direction of the swivel axes 12, 14, an elevating mechanism in the form of a controllable pneumatic piston-cylinder unit 16 engages the guide vane 4. A piston-cylinder rod 17 in this case is hinged to the stop 9 of the guide vane 4 via a swivel pin 18. A swivel connection between the cylinder 19 of the piston-cylinder unit 16 with the base frame 1 of the sheet metal punching machine is made via a swivel pin 20.

A further controllable pneumatic piston-cylinder unit 21 is mounted on the bearing plate 13. It includes a cylinder 22 connected permanently with the bearing plate 13 as well as a piston rod 23 guided capable of moving therein in the horizontal direction in accordance with FIG. 3 and serves for mutual locking of the guide vane 4 as well as the bearing plate 13. For this purpose a hole is associated with the free end of the piston rod 23 used as a locking pin as a locking pin support on the guide vane 4. The fastening screws 24, 25 hold the bearing of the swivel pin 20.

FIG. 3 shows the guide vane 4 in the raised position in accordance with FIG. 1, in which the sheet metal parts are guided to the collecting and transporting box 10. If the sheet metal parts prepared at the punching station 8 are to be conveyed to the collecting and transporting box 11—for example because the collecting and transporting box 10 is filled or because sheet metal parts with a changed contour are being produced—the guide vane 4 is to be swivelled out of its raised position in accordance with FIGS. 1 and 3 next with operation of the piston-cylinder unit 16 into its horizontal initial position, in which it can be temporarily store the sheet metal parts concerned. Then the guide vane 4 can be locked by driving the piston rod 23 of the piston-cylinder unit 23 on the bearing plate 13. By operating the piston-cylinder unit 16 the unit of guide vane 4 and bearing plate 13 now is swivelled into the position in accordance with FIGS. 2 and 4. The sheet metal parts previously fed to the guide vane 4 via the feeding chute 2 and temporarily stored on the guide vane 4 then can enter the collecting and transporting box 11 via the removing chute 6. So that in the case of swiveling of the guide vane 4 into the raised position in accordance with FIGS. 1 and 3, and unintentional swiveling of the bearing plate 13 around the second swivel axis 14 is excluded, the bearing plate 13 can be locked on the base frame 1 of the machine before raising the guide vane 4 out of its horizontal initial position, for example by means of the piston-cylinder unit 21.

A locking of this kind can be achieved in the case of sufficient tightness of the swivel connection between the bearing plate 13 and the base plate 15 produced via the second swivel axis.

Figure 5:
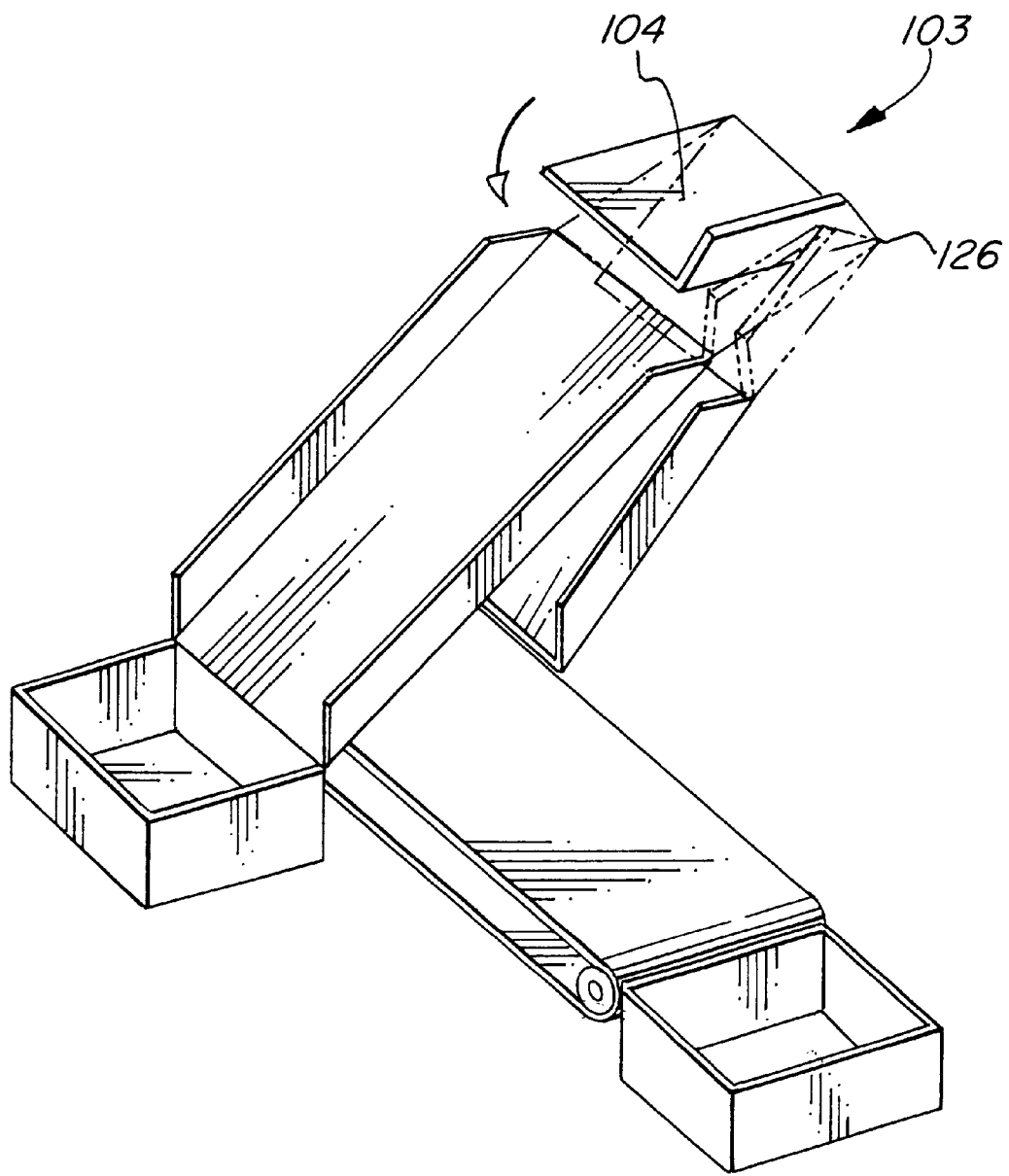
FIG. 5 is an illustration of a second embodiment of the sorting device for sorting punched parts on a sheet metal punching machine.

In the case of the sorting device in accordance with FIG. 5, instead of the guide device 3 with the guide vane 4 in accordance with FIGS. 1 to 4, a guide device 103 with a guide element in the form of a guide vane 104 is used, which, beginning from its horizontal initial position, in which the prepared punched parts are fed to it. can be swivelled around a swivel axis 126. The guide vane 104 makes it possible to discharge the sheet metal parts to be sorted on one and the same side of the sheet metal punching machine from the latter. The different removal devices in this case differ in their inclination with respect to the horizontal.

Figure 6:
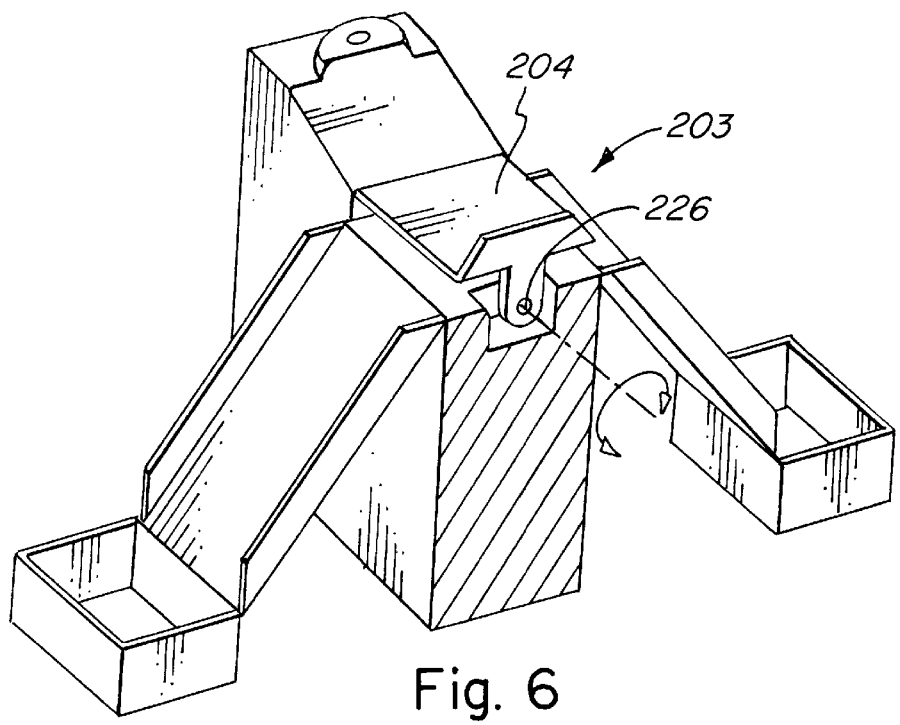
FIG. 6 is an illustration of a third embodiment of the sorting device for sorting punched parts on a sheet metal punching machine with the guide member in a horizontal position.
Figure 7:
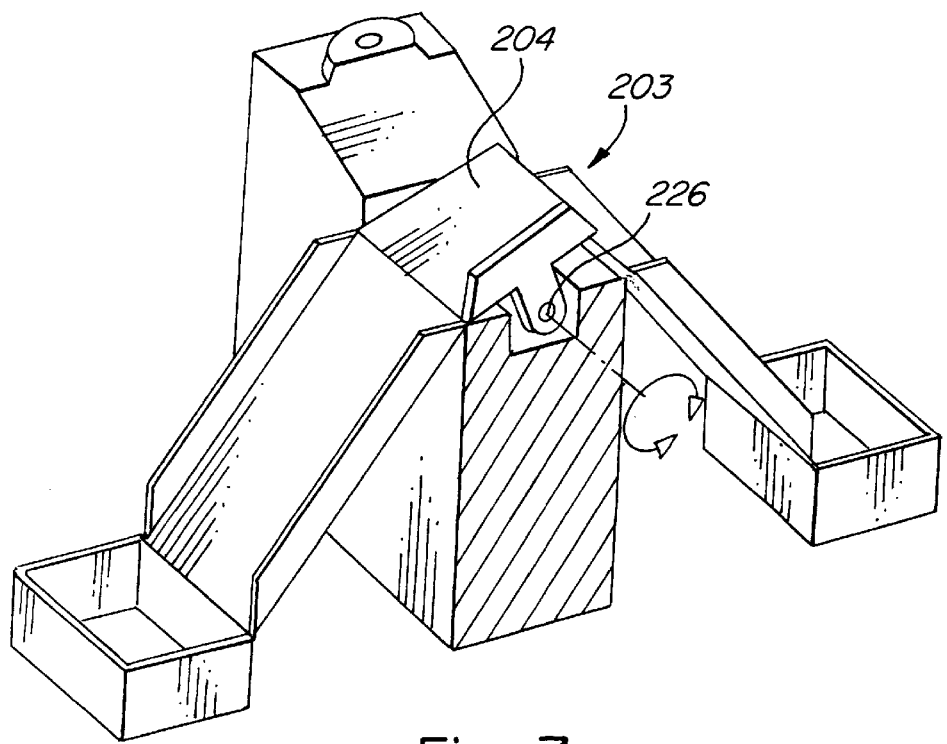
FIG. 7 is a similar illustration of the sorting device of FIG. 6 with the guide member in a tilted position.

In accordance with FIGS. 6 and 7 a guide device 203 with a rocker-like guide vane 204 is used as a guide element which can be swivelled around a swivel axis 226 located at a distance from edges of the guide vane 204 lying opposite on another.

Figure 8:
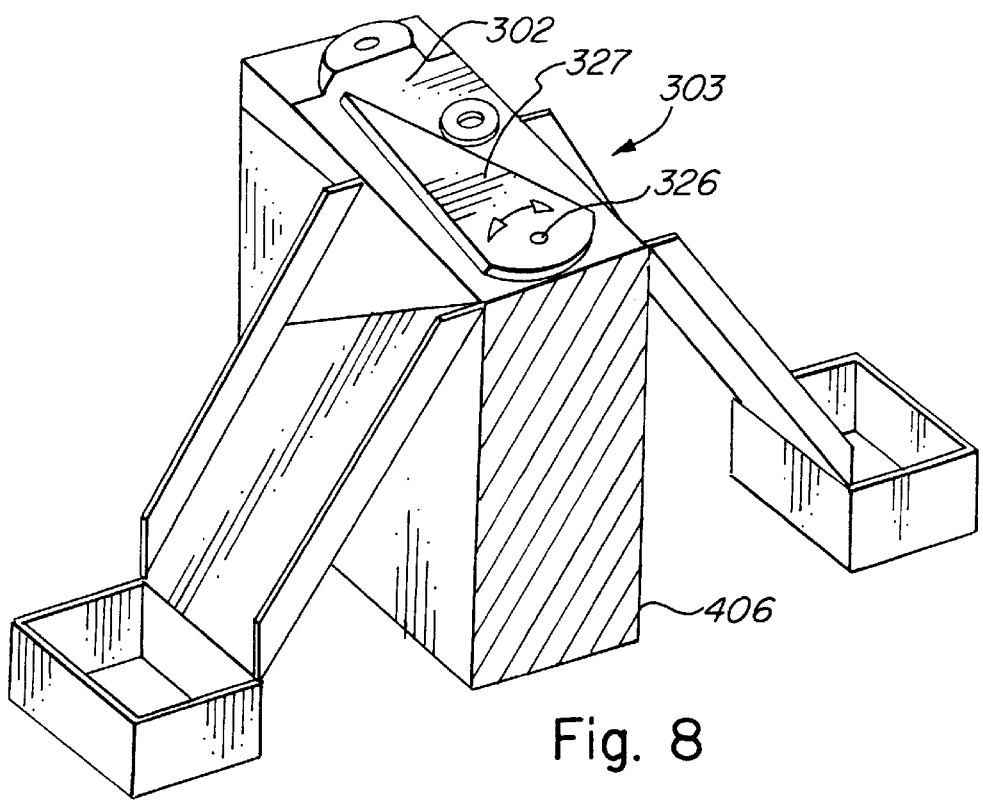
FIG. 8 is an illustration of a fourth embodiment of the sorting device for sorting punched parts on a sheet metal punching machine with a swiveling lever in a first position.
Figure 9:
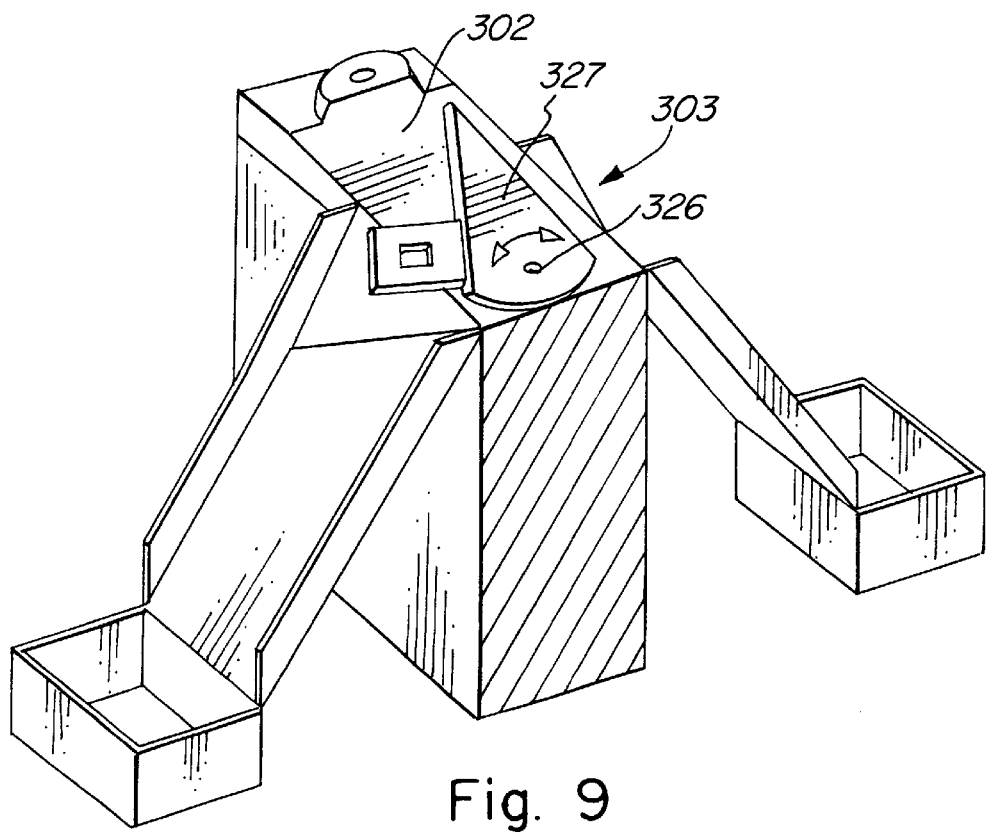
FIG. 9 is a similar illustration of the device of FIG. 8 with the swiveling lever in an alternate position.

A guide device 303, as is shown in FIGS. 8 and 9, is made as a deflector and has as a guiding element a swivel lever 327, which is mounted capable of swiveling around a swivel axis 326 running transverse to the bearing surface 302 on a feeding chute serving as a bearing surface 302 for the sheet metal parts. Depending on its swivel position, the swivel lever 327 guides the sheet metal parts fed to it under the influence of the force of gravity into one or the other directions of conveyance. Unlike the other guide arrangements proposed as examples, the guide arrangement 303 offers no intermediate storage for the sheet metal parts to be discharged.

Figure 10:
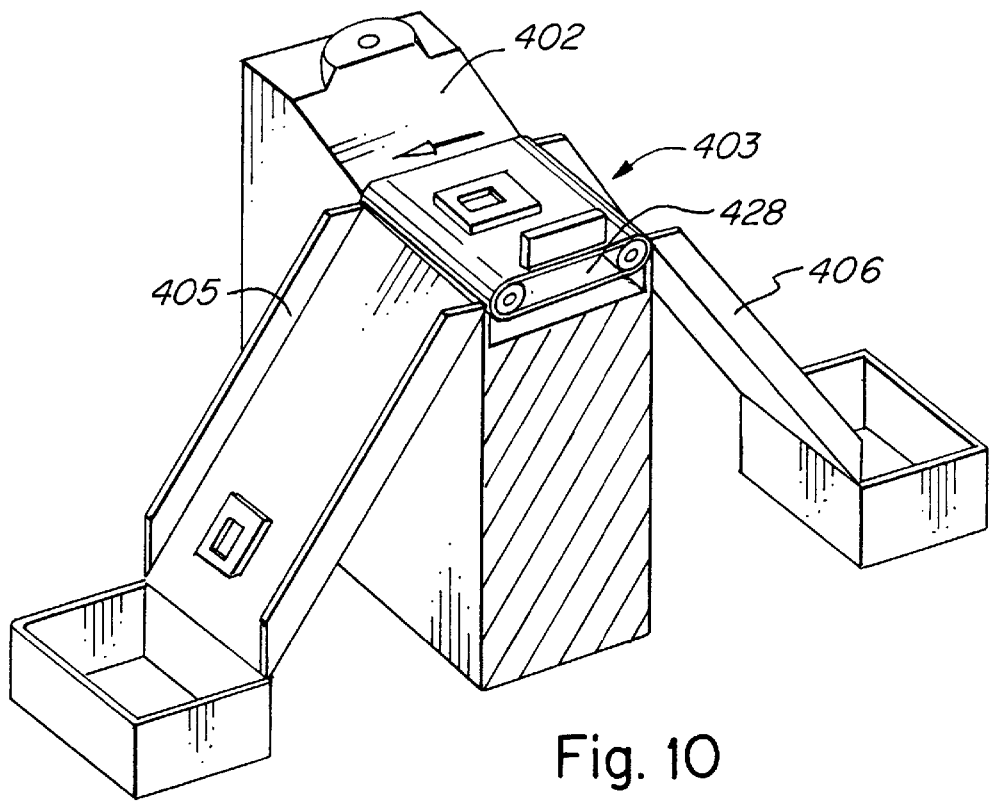
FIG. 10 is an illustration of a fifth embodiment of the sorting device for sorting punched parts on a sheet metal punching machine with a movable belt device rotating in a first direction shown by the arrow.
Figure 11:
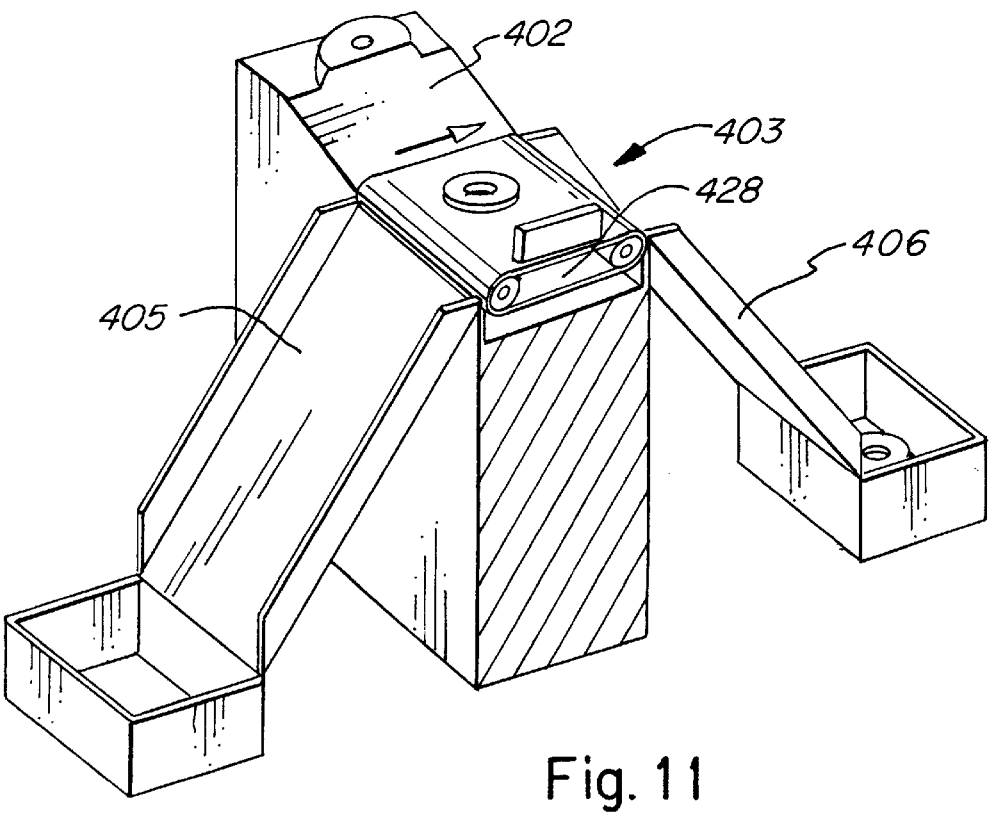
FIG. 11 is a similar view of the sorting device with the movable belt rotating in the opposite direction as shown by the arrow.

In accordance with FIGS. 10 and 11, the guide arrangement 403 is a horizontal conveyor with a guide element made as an endless conveyor belt 428, capable of being controlled in this direction of motion, to which the sheet metal parts are fed via a feeding chute 402 and from which the sheet metal parts temporarily stored on it optionally are transferred to a removing chute 405 or a removing chute 406.

The control conditions of the guide elements described above—therefore the swivel positions of the guide vanes 4, 104, 204, the swivel position of the swivel lever 327, as well as the direction of motion of the endless conveyor belt 428—are adjusted automatically by means of the numerical control of the sheet metal punching machine.

What is claimed is:

1. A machine tool/parts sorter assembly comprising:
   (a) a machine tool having a frame and a workstation at which multiple parts are cut from workpieces as the workpiece is moved in a horizontal plane relative to the workstation, said machine tool also including a computer control for controlling the machine tool operation to produce different parts from a workpiece; and
   (b) a sorter coupled with said machine tool frame adjacent said workstation to receive machined parts therefrom and for separately guiding different parts to different discharge areas adjacent the machine tool, said sorter including:
      (i) a guide member adjacent said workstation for receiving the parts from said workstation,
      (ii) a pair of spaced, downwardly inclined guide chutes for discharging parts to separate discharge areas, and
      (iii) means for selectively moving said guide member to discharge parts thereon into said guide chutes, said means for selectively moving said guide member being operable by said machine tool computer control to move said guide member to direct parts to a selected one of said guide chutes corresponding to the parts being produced by said machine tool in the machine tool operation.

2. The machine tool/parts sorter assembly in accordance with claim 1 wherein said machine tool frame includes a guide surface extending from said workstation to said guide member for delivery of parts thereto.

3. The machine tool/parts sorter assembly in accordance with claim 1 wherein said guide member is selectively pivotable about an axis between positions in which it is inclined towards said chutes.

4. The machine tool/parts sorter assembly in accordance with claim 3 wherein said chutes are disposed upon opposite sides of said frame and said axis extends perpendicularly to the longitudinal axes of said chutes.

5. The machine tool/parts sorter assembly in accordance with claim 3 wherein said guide member is pivotable about a pair of spaced parallel axes extending perpendiculary to the longitudinal axes of said chutes.

6. The machine tool/parts sorter assembly in accordance with claim 3 wherein said sorter includes a bearing plate and a base plate therebelow, said guide member being pivotably mounted to one side of said bearing plate to provide a first pivotal axis and the other side of said bearing plate being pivoted to said base plate to provide a second pivotal axis.

7. The machine tool/parts sorter assembly in accordance with claim 6 wherein said guide member can be locked to said bearing plate to swivel therewith.

8. The machine tool/parts sorter assembly in accordance with claim 7 wherein said sorter includes on said guide member and bearing plate a cooperating locking pin and an engagement surface, and means for moving said locking pin into and from engagement in said recess.

9. The machine tool/parts sorter assembly in accordance with claim 8 wherein said locking pin is a piston movable by a fluid actuated cylinder.

10. The machine tool/parts sorter assembly in accordance with claim 3 wherein said selective moving means is a piston/cylinder assembly engaged with said guide member to effect said pivotal movement about said axis.

11. The machine tool/parts sorter assembly in accordance with 10 wherein said cylinder is mounted below said guide member and is pivotable about a parallel axis.

12. The machine tool/parts sorter assembly in accordance with claim 3 wherein said chutes extend towards the same side of said frame in overlying relationship with their upper ends at different elevations, said guide member being pivotable into positions aligned with said upper ends to discharge the parts thereinto.

13. The machine tool/parts sorter assembly in accordance with claim 3 wherein said guide member includes a reversible conveyor belt assembly extending between the upper ends of said chutes oriented on opposite sides of said frame.

14. The machine tool/parts sorter assembly in accordance with claim 3 wherein said chutes are on opposite sides of said frame and said guide member pivot axis is intermediate said chutes.

15. The machine tool/parts sorter assembly in accordance with claim 1 wherein said chutes are on opposite sides of said frame and wherein said guide member includes a lever having its end spaced from said workstation pivotable about a vertical axis selectively to deflect the parts towards said chutes.

\* \* \* \* \*